(12) United States Patent
Gupta (10) Patent No.: US 12,018,937 B2
(45) Date of Patent: Jun. 25, 2024

(54) COMBINATION MEASURING TAPE/CHALK MARKER HOLDER

(71) Applicants: DPG USA INC., Schaumburg, IL (US); Nikhil Gupta, Schaumburg, IL (US)

(72) Inventor: Nikhil Gupta, Schaumburg, IL (US)

(73) Assignee: DPG USA INC., Schaumburg, IL (US)

( * ) Notice: Subject to any disclaimer, the term of this patent is extended or adjusted under 35 U.S.C. 154(b) by 0 days.

(21) Appl. No.: 17/906,274

(22) PCT Filed: Mar. 18, 2021

(86) PCT No.: PCT/US2021/023047
§ 371 (c)(1),
(2) Date: Sep. 14, 2022

(87) PCT Pub. No.: WO2021/188845
PCT Pub. Date: Sep. 23, 2021

(65) Prior Publication Data
US 2023/0090040 A1    Mar. 23, 2023

Related U.S. Application Data

(60) Provisional application No. 62/992,851, filed on Mar. 20, 2020.

(51) Int. Cl.
*G01B 3/1089* (2020.01)
*A41H 1/06* (2006.01)
*G01B 3/1043* (2020.01)

(52) U.S. Cl.
CPC ............. *G01B 3/1089* (2020.01); *A41H 1/06* (2013.01); *G01B 3/1043* (2020.01)

(58) Field of Classification Search
CPC .. G01B 3/1089; G01B 3/1043; G01B 3/1041; A41H 1/06; D06H 1/00
See application file for complete search history.

(56) References Cited

U.S. PATENT DOCUMENTS

D342,686 S  * 12/1993  Rios ............................... D10/61
5,477,619 A    12/1995  Kearns
(Continued)

FOREIGN PATENT DOCUMENTS

CN            107702609 A    2/2018
WO    WO-2021188845 A1 *  9/2021  ............... A41H 1/06

*Primary Examiner* — Yaritza Guadalupe-McCall
(74) *Attorney, Agent, or Firm* — Dunlap Bennett & Ludwig, PLLC; Anna L. Kinney (57) ABSTRACT

A combination measuring tape/chalk marker holder includes a main housing and a chalk retention pocket. The main housing has a main housing shell with a base and a back plate. The main housing is an equilateral triangular prismatic body with two outwardly curved lateral walls meeting at an apex. Within the housing, a locking reel holding a flexible measuring tape is releasably engaged with a locking hub formed on the back plate. The measuring tape extends through a portal formed in one of the outwardly curved lateral walls. The chalk retention pocket is fixed to and extends from the back plate. The pocket has a base parallel to and coextensive with the main housing base, two parallel lateral walls, and a flexible chalk retention member. The chalk retention pocket is flexible and removably retains a convex lensate marking body. A rotatable foot enables the holder to stand erect.

8 Claims, 11 Drawing Sheets

(56) References Cited

U.S. PATENT DOCUMENTS

| | | | |
|---|---|---|---|
| 6,553,631 B1 | 4/2003 | Douglas | |
| 6,612,046 B1 | 9/2003 | Cimorell et al. | |
| 6,789,329 B1 * | 9/2004 | Hester | G01B 3/1084 33/760 |
| 6,826,845 B2 * | 12/2004 | Pritchard | G01B 3/1084 33/760 |
| 6,978,553 B2 * | 12/2005 | Doublet | G01B 5/245 33/1 G |
| 7,260,899 B2 * | 8/2007 | Jones | G01B 3/1041 33/760 |
| 9,354,031 B1 * | 5/2016 | Darr | G01B 3/1084 |
| 2006/0107546 A1 * | 5/2006 | Pritchard | G01B 3/1056 33/760 |
| 2007/0107248 A1 * | 5/2007 | Jones | G01B 3/1041 33/760 |
| 2023/0090040 A1 * | 3/2023 | Gupta | G01B 3/1089 |

* cited by examiner

COMBINATION MEASURING TAPE/CHALK MARKER HOLDER

CROSS-REFERENCE TO RELATED APPLICATION

This application is a National Stage Entry of PCT application PCT/US21/23047. PCT application PCT/US21/23047 claims the benefit of priority of U.S. provisional application No. 62/992,851, filed Mar. 20, 2020, the contents of which are herein incorporated by reference.

BACKGROUND OF THE INVENTION

Tailors and seamstresses typically work with fabrics having significant value to fashion clothing and other useful items which require precise fit to the individual to be clothed so as to provide an attractive appearance. Inasmuch as these items are cut from whole cloth, accurate fitting requires placing marks on the fabric to guide them in precise cutting. Traditionally, tailor's chalk is used for the actual marking as it is considered easily removed, while a measuring tape is used for measuring where numerical values are used to determine where the cut is to be made. In observation of seamstresses actually practicing their craft, the present inventor noticed that use of a tape measure is almost invariably followed by use of chalk yet often the chalk is not readily at hand, perhaps being obscured in a fold of the cloth being cut or otherwise not in the most convenient location, so sometimes a significant amount of time is wasted in locating either the chalk or the tape measure after the other has been used.

SUMMARY OF THE INVENTION

I address this issue by providing a combination tape measure chalk holder allowing the seamstress or tailor to positively retain the chalk while using the tape measure having a generally equilateral triangular prismatic body with a generally planar basal surface having a portal formed in a lateral surface of said prismatic body, an outwardly projecting chalk retention pocket formed adjacent the generally planar basal surface, a portal being formed medially in one of said planar surfaces; a resilient chalk retention member projecting from said body bearing a pressing disc generally adjacent the centroid of said prismatic body having a section formed thereupon projecting inwardly toward said prismatic body; the chalk retaining pocket being adapted to removably retain a thin convex lensate marking body of generally the same peripheral shape as said generally equilateral prismatic body in said chalk retention pocket; a rotatable reel disposed within said angular prismatic body, having a flexible tape disposed thereabout, a spring operably connected to said reel and urging it to rotate counter to extension of said tape; a ratchet restraining said reel from rotation counter to extension of said tape and a clutch operable to disengage said ratchet from said reel, a clutch actuator projecting through said portal being formed medially in said one of said planar surfaces operable to disengage said clutch and allow said spring to rotate said reel to withdraw said tape into said prismatic body.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
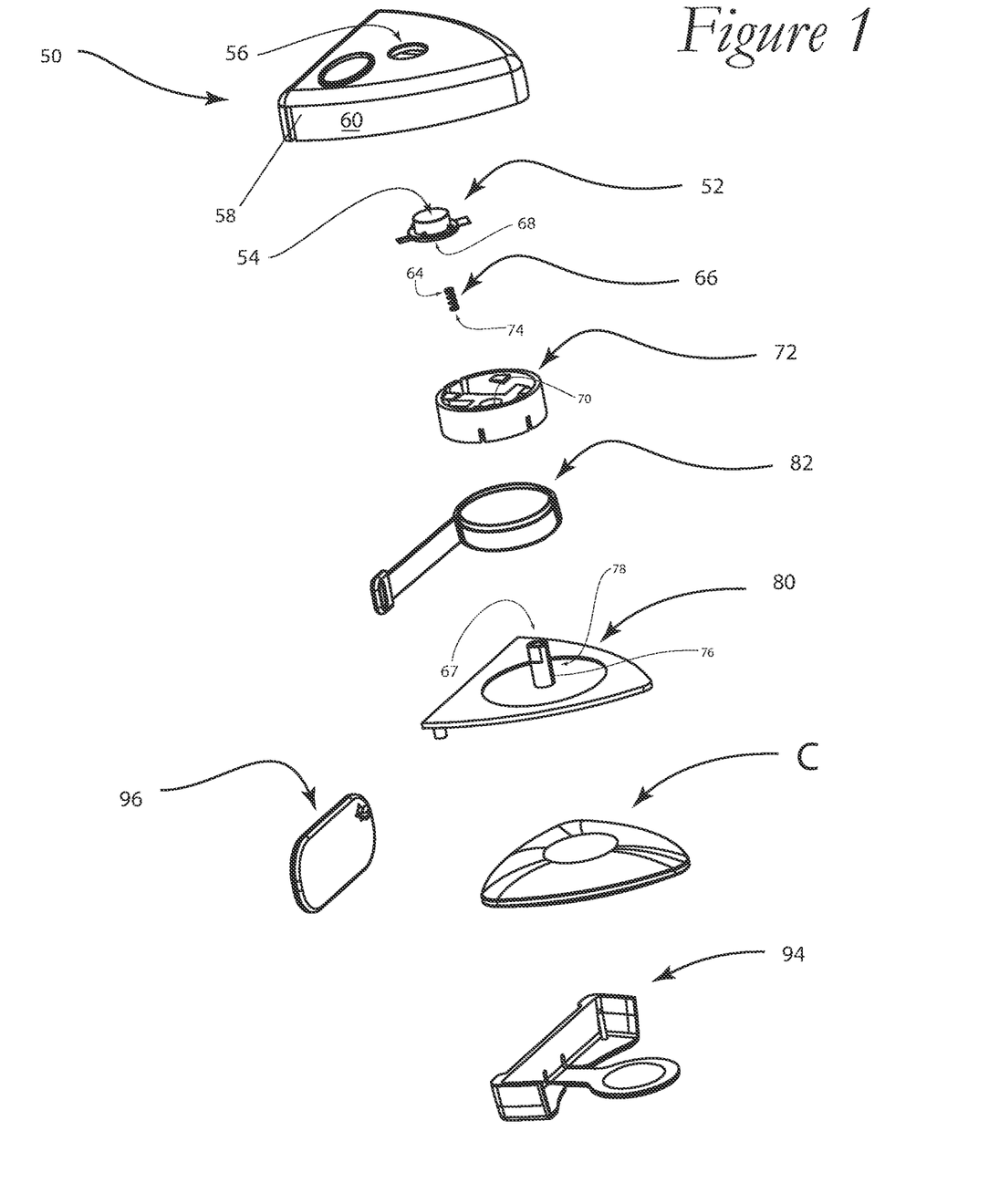
FIG. 1 is an exploded isometric perspective illustrating the component parts of the Combination Measuring Tape/Chalk Marker Holder.
Figure 2:
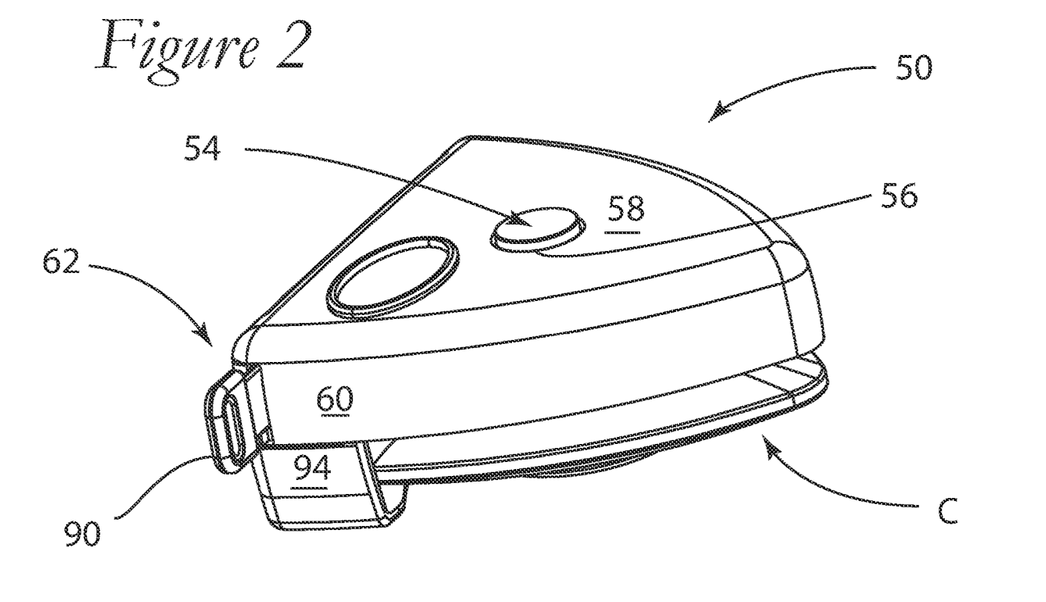
FIG. 2 is an isometric perspective illustrating the reverse of the Combination Measuring Tape/Chalk Marker Holder.
Figure 3:
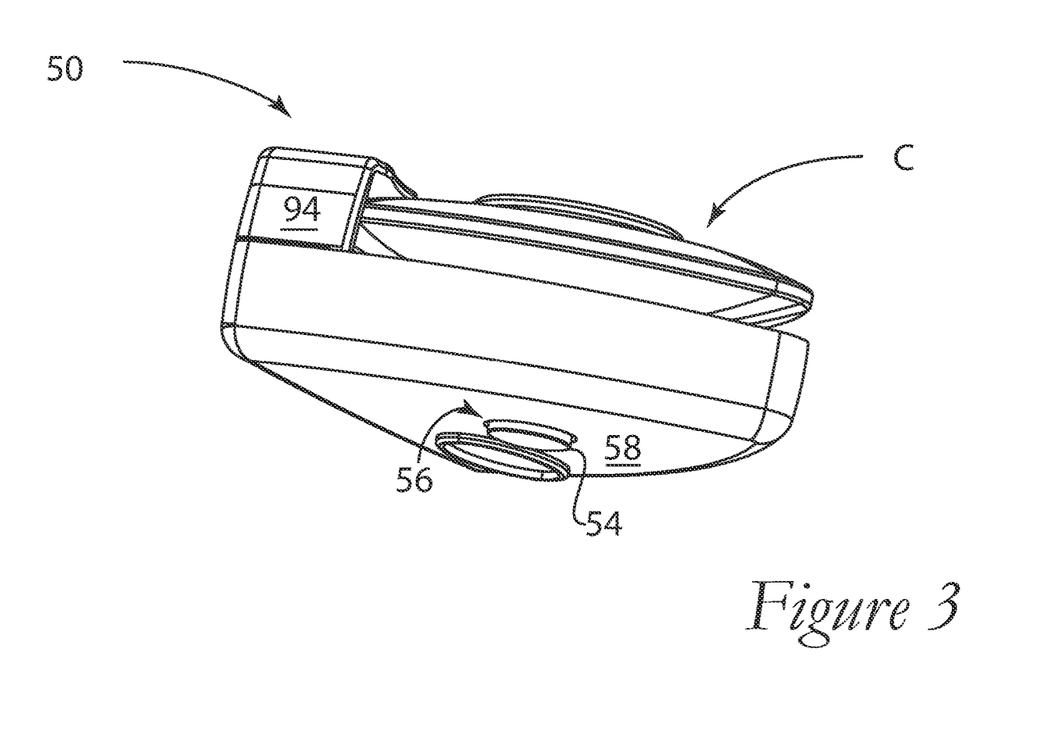
FIG. 3 is an isometric perspective illustrating the Combination Measuring Tape/Chalk Marker Holder with the tailor's chalk being retained in position in a retention pocket therefor.
Figure 20:
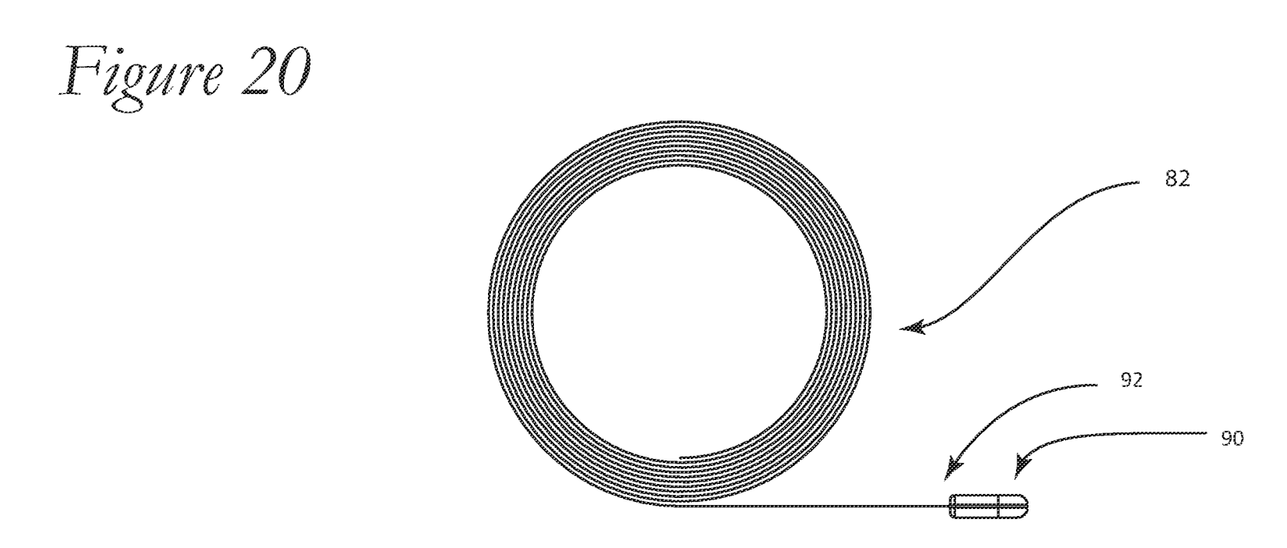
FIG. 20 is a front elevation of the tape measure housed inside the prismatic body.
Figure 21:
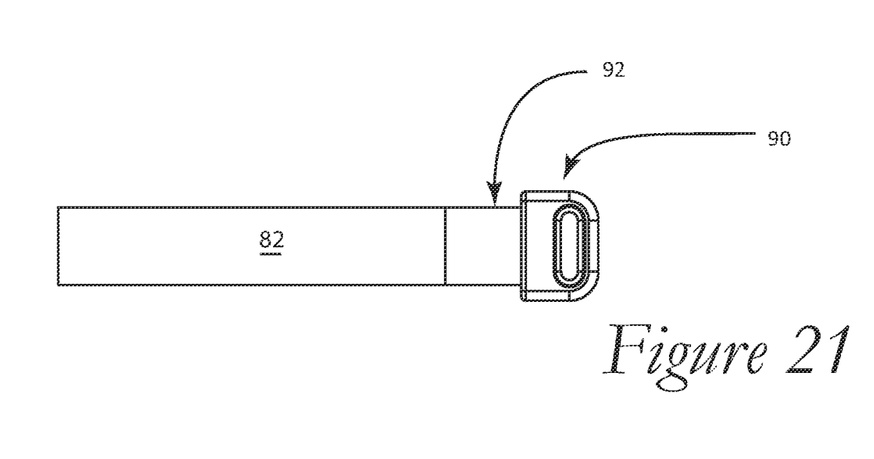
FIG. 21 is a plan view of the tape measure of FIG. 20.
Figure 22:
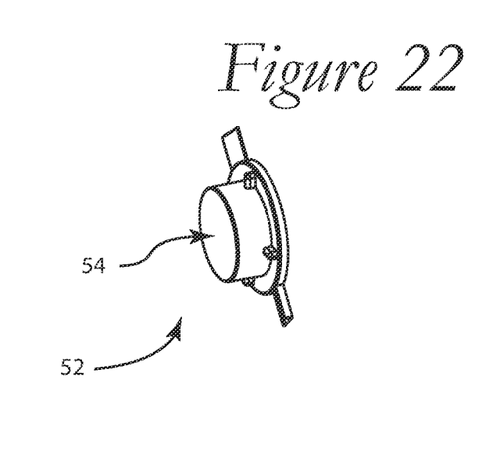
FIG. 22 is an isometric perspective of the combination hub and disengagement button used to disengage the locking reel to permit retraction of the tape used in Combination Measuring Tape/Chalk Marker Holder.
Figure 23:
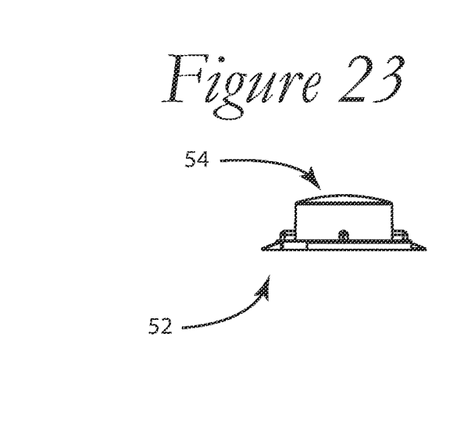
FIGS. 23-25 are respectively a frontal elevation, an upper plan view, and left elevation of the combination hub and disengagement button of FIG. 22.
Figure 24:
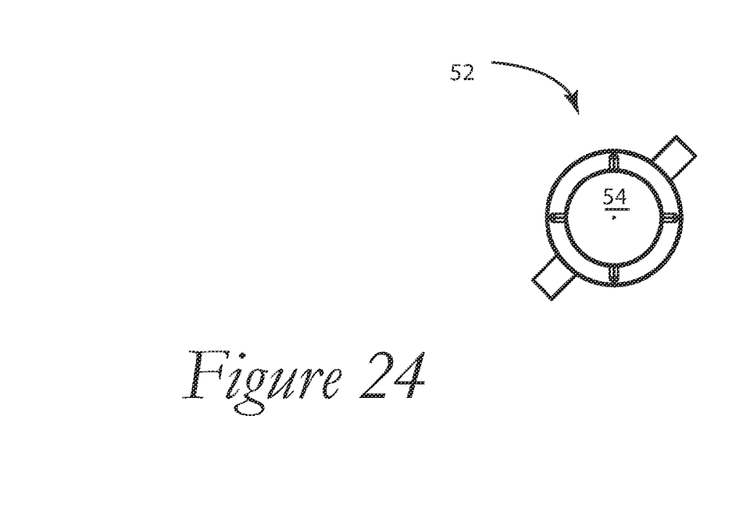
Figure 25:
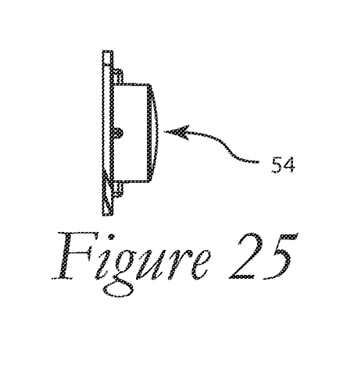
Figure 26:
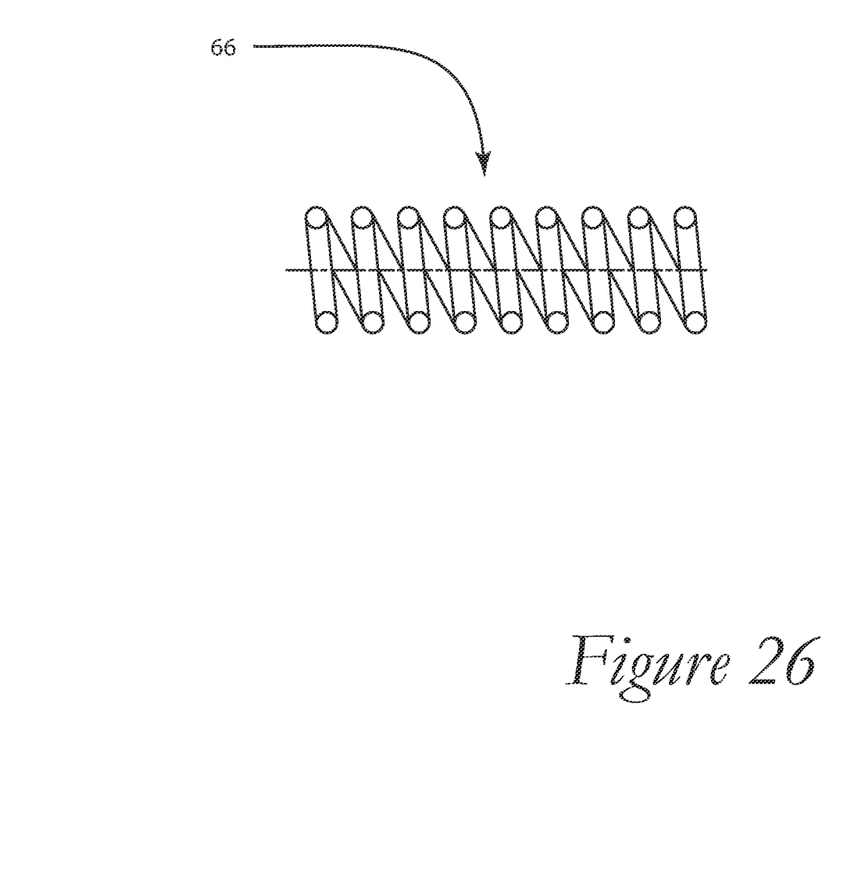
FIGS. 26 and 27 are respectively a front elevation and an upper plan view of the spring used to hold the locking hub in locking engagement with the reel and impel retraction of the tape when hub and reel are urged out of locking engagement.
Figure 27:
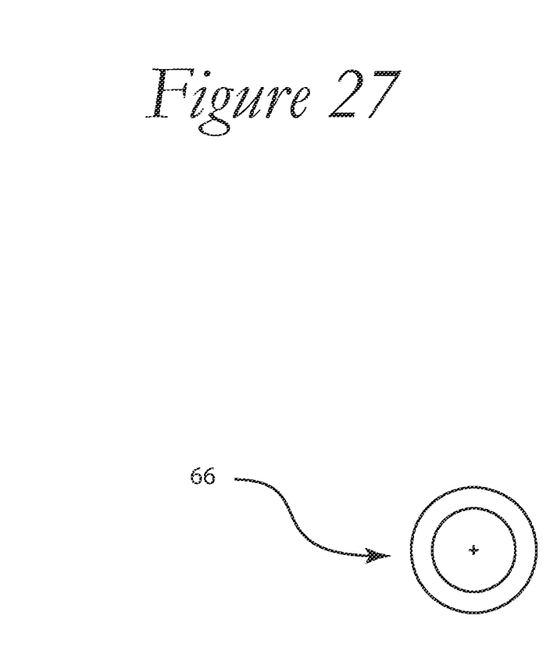
Figures 28, 29, 30:
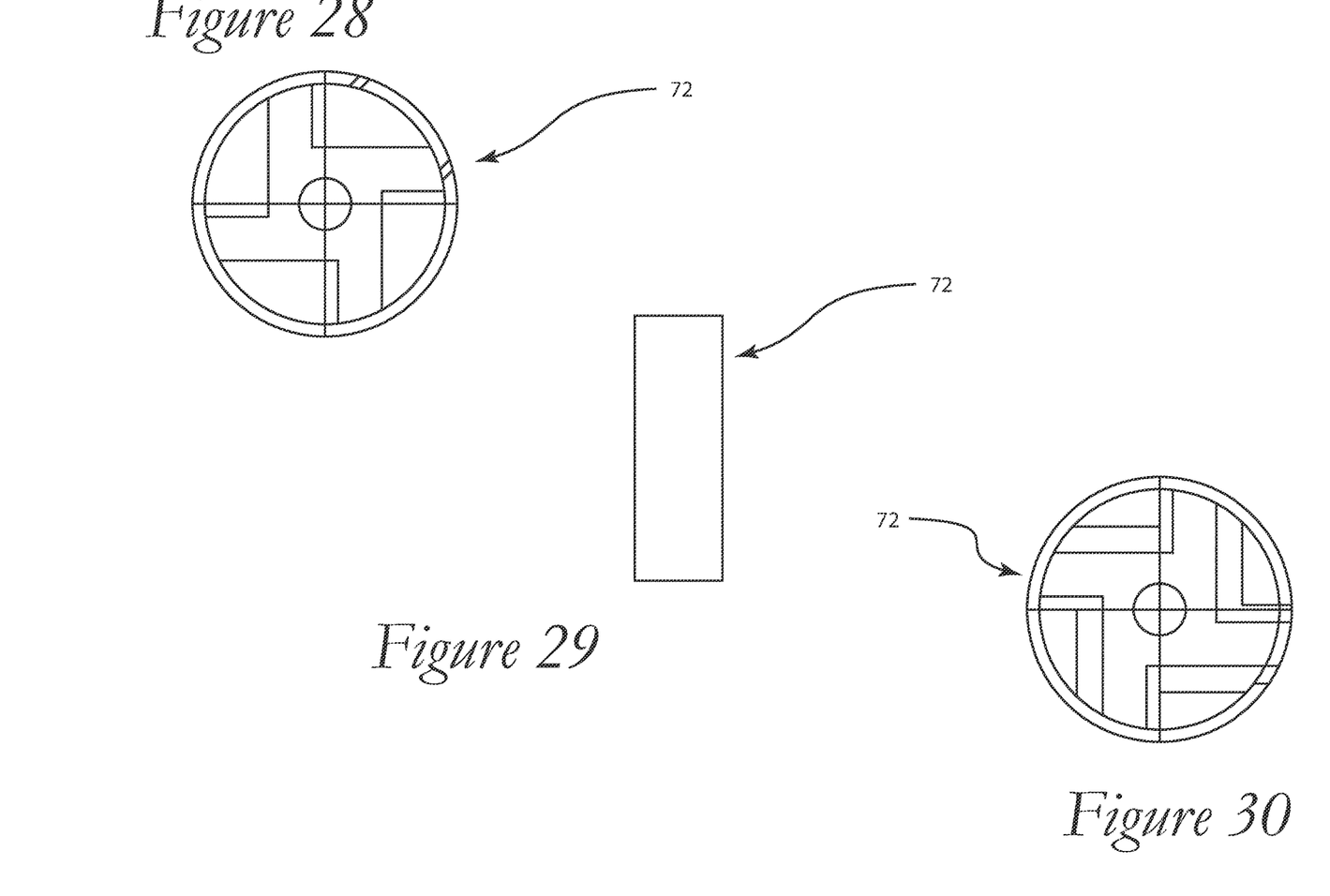
FIGS. 28-30 are respectively an upper plan view, right elevation and lower plan view of the locking reel.
Figures 31, 32, 33, 34:
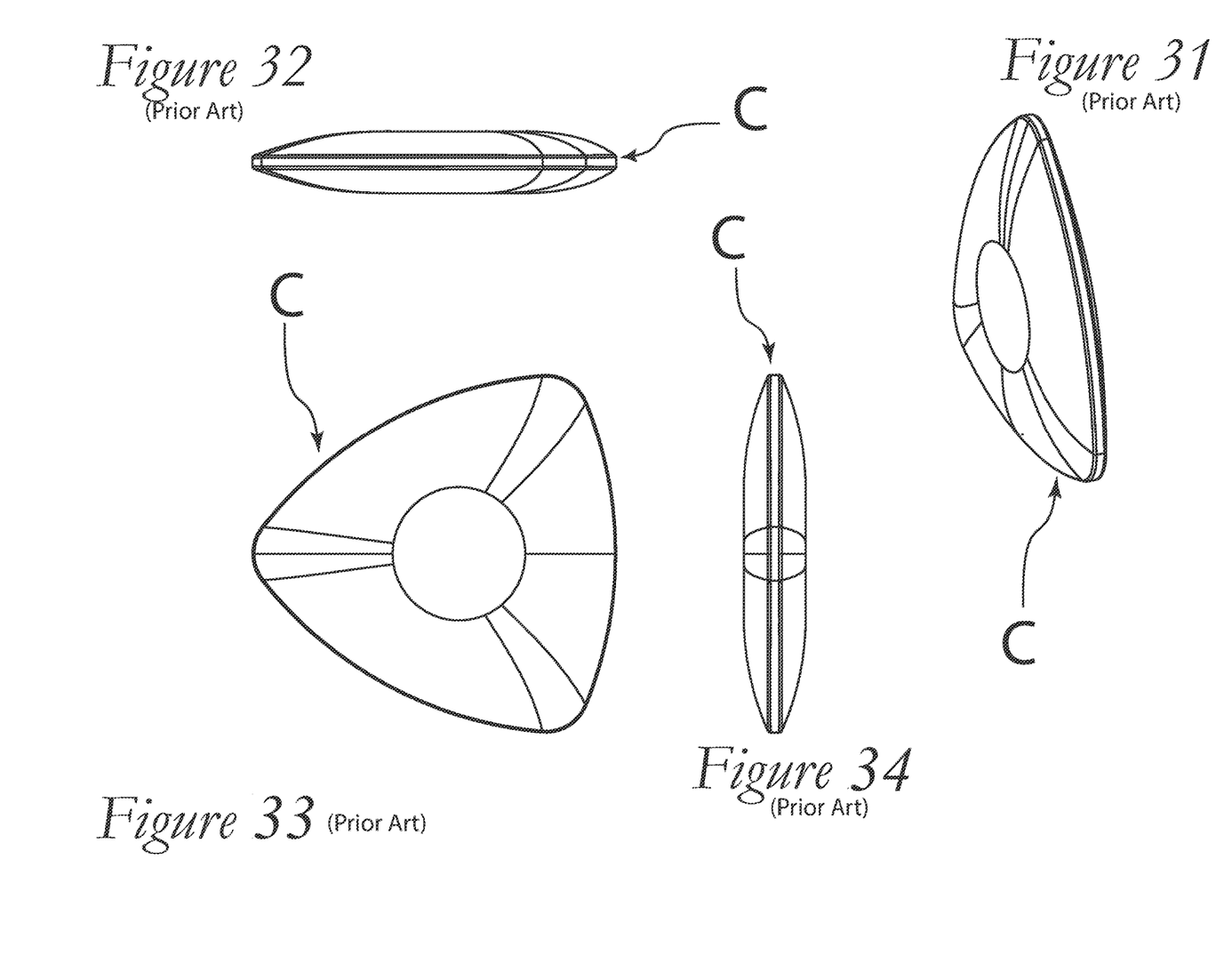
FIG. 31 is an isometric perspective of a conventional prior art marking chalk.
FIGS. 32, 33, and 34 are a right elevation, frontal view and left elevation of a conventional prior art marking chalk.

In FIG. 1, an exploded isometric perspective of the Combination Measuring Tape/Chalk Marker Holder 50 is shown in which combination hub and disengagement button 52 has upper release protrusion 54 projectable through release aperture 56 of main housing 58 having lateral wall 60 with tape aperture 62 formed therein. Upper end 64 of spring 66 is retained within central cavity 68 of combination hub and disengagement button 52 (FIGS. 22-25), and projects through central opening 70 in locking reel 72, while lower end 74 of spring 66 is retained within retaining aperture 67 in lower portion 76 of reel locking hub 78 formed on back plate 80. Tape 82 is disposed around locking reel 72 with free end 92 thereof projecting through tape aperture 62 formed in lateral wall 60 of main housing shell 58 with tab 90 preventing withdrawal of free end 92 of tape 82 into housing shell 58. (FIGS. 20-21.) Conventional Prior Art tailor's chalk C is retained within chalk retention pocket 94 fixed to back plate 80. Rotatable foot member 96 has capped pin 98 projecting therefrom protruding through foot retention aperture 86. (FIGS. 4, 16-19.) FIGS. 2 and 3 detail external features of Measuring Tape/Chalk Marker Holder 50. FIGS. 4-7 illustrate details of shell 58. FIGS. 8-11 illustrate details of back plate 80. FIGS. 12-15 illustrate details of chalk pocket 94. FIGS. 16-19 illustrate details of rotatable foot 96. FIGS. 20 & 21 illustrate details of tape 82. FIGS. 22-25 illustrate details of combination hub and disengagement button 52. FIGS. 26 & 27 illustrate details of spring 66. FIGS. 28-30 illustrate details of locking reel 72. FIGS. 31-33 illustrate the contours of a conventional PRIOR ART chalk C.

Figure 4:
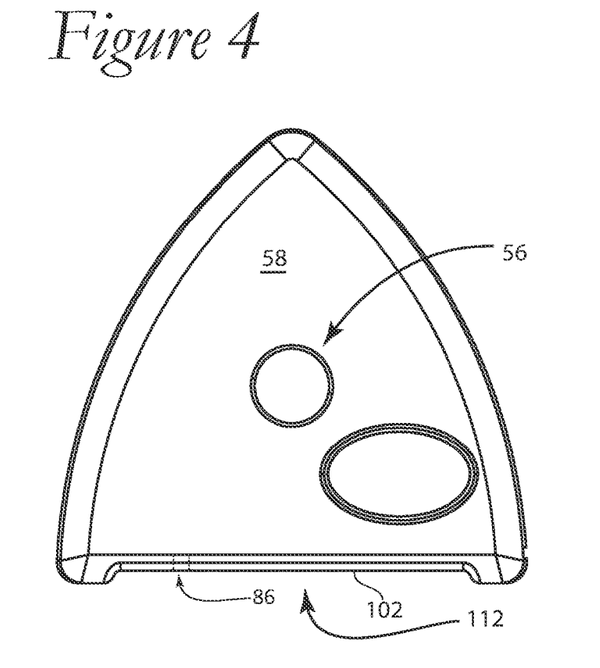
FIGS. 4-6 are a front elevation, left elevation and lower plan view of the main housing of the Combination Measuring Tape/Chalk Marker Holder, respectively.
Figure 5:
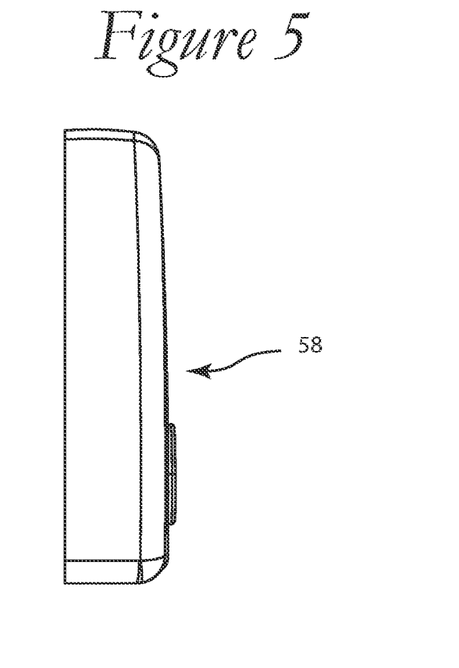
Figures 6, 7:
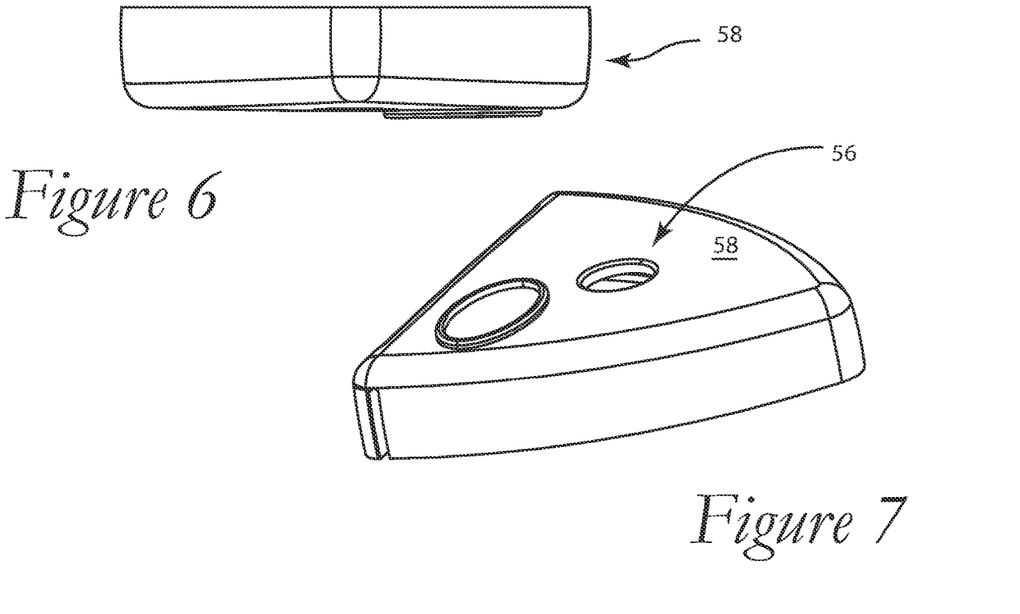
FIG. 7 is an isometric perspective of frontal shell the main housing.
Figure 8:
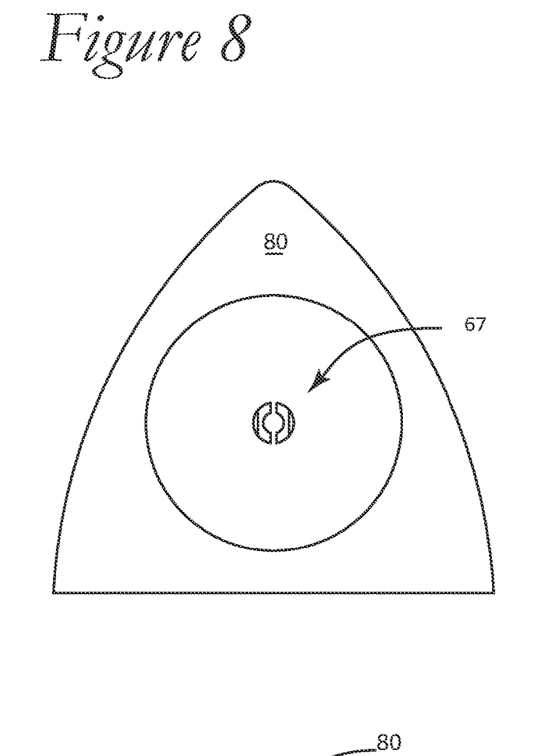
FIGS. 8-10 are a front elevation, right elevation and lower plan view of the back plate to the main housing of the Combination Measuring Tape/Chalk Marker Holder, respectively.
Figure 9:
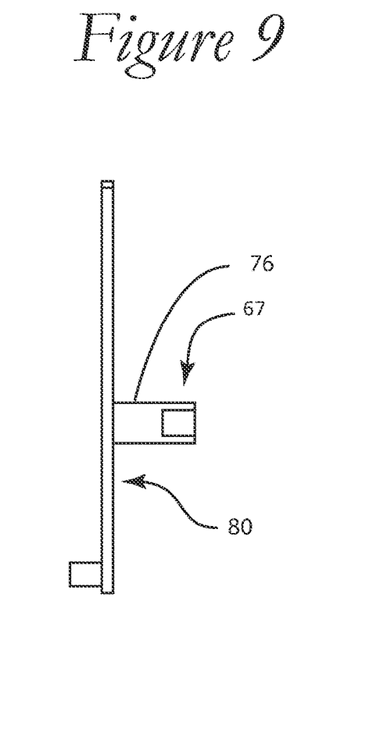
Figures 10, 11:
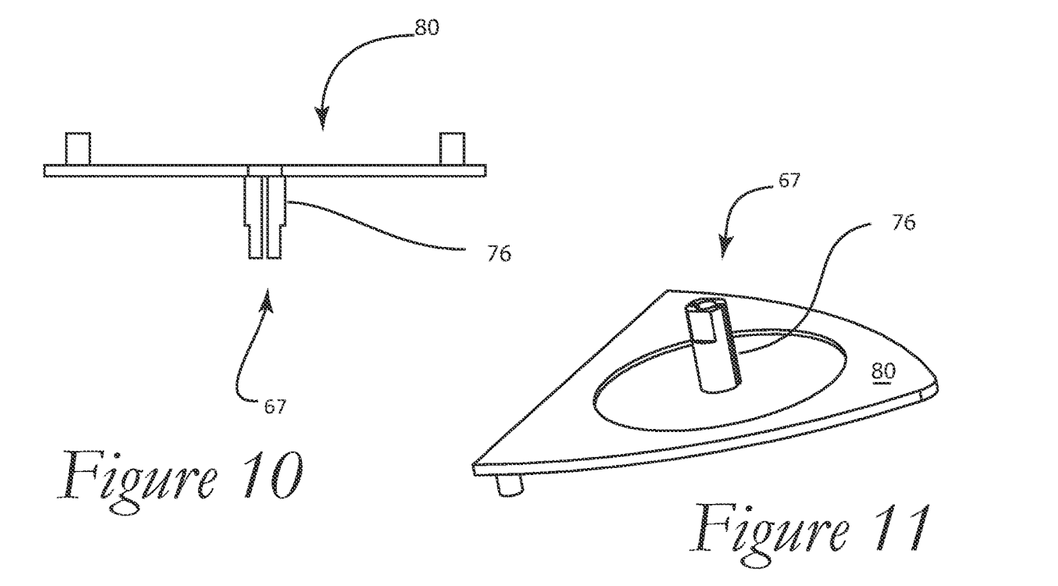
FIG. 11 is an isometric perspective of the back plate of FIGS. 8-10.
Figure 12:
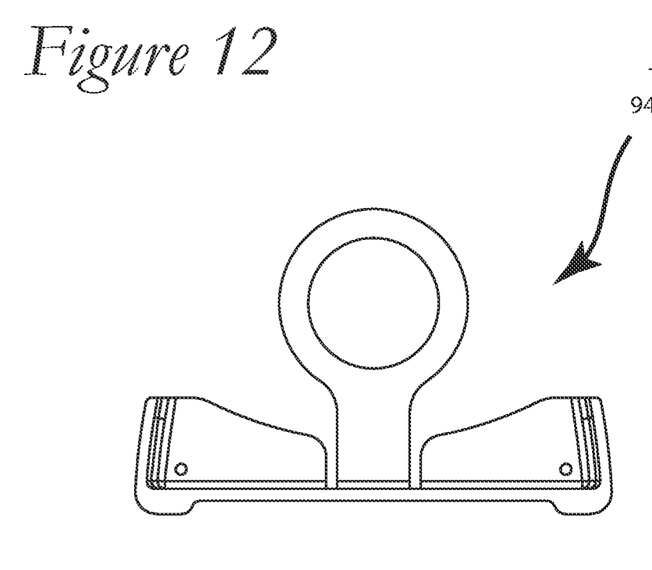
FIGS. 12-14 are a rear elevation, right elevation and a lower plan view of the chalk retention pocket of the Combination Measuring Tape/Chalk Marker Holder, respectively.
Figure 13:
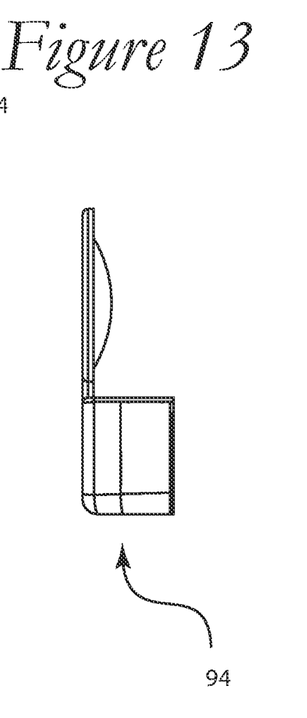
Figures 14, 15:
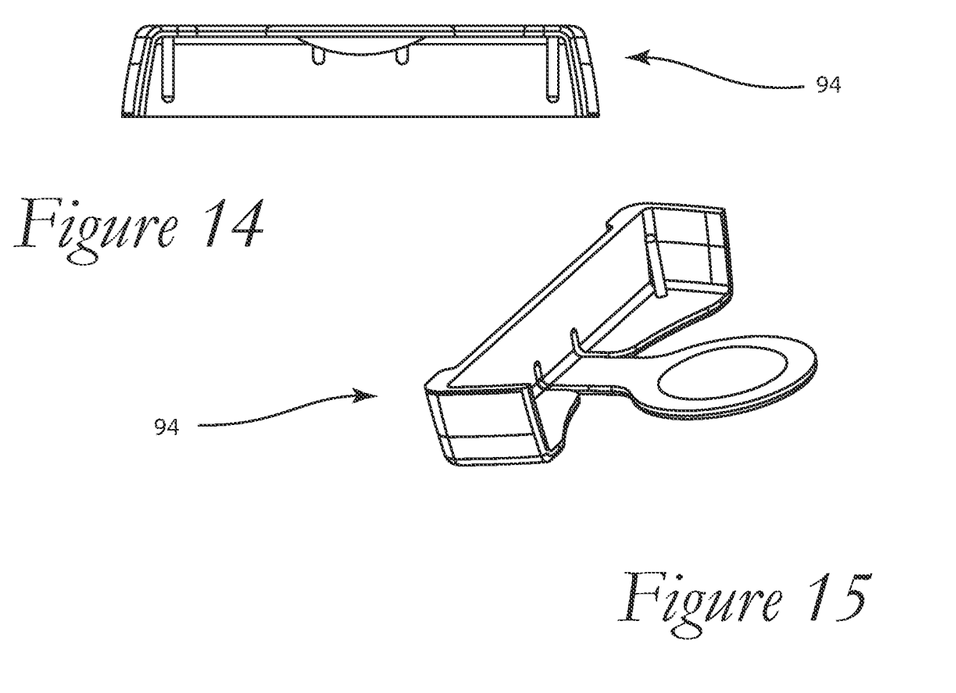
FIG. 15 is an isometric perspective of the chalk retention pocket of FIGS. 12-14.
Figure 16:
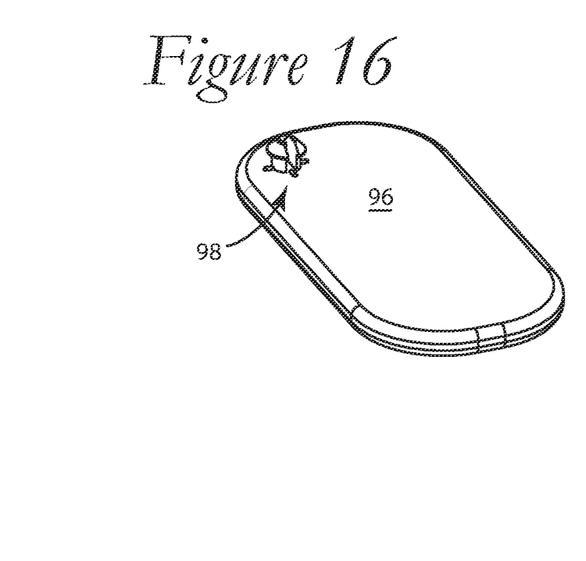
FIG. 16 is a lower isometric perspective of the rotatable foot member used for stabilization of the Combination Measuring Tape/Chalk Marker Holder in an upright position.
Figure 17:
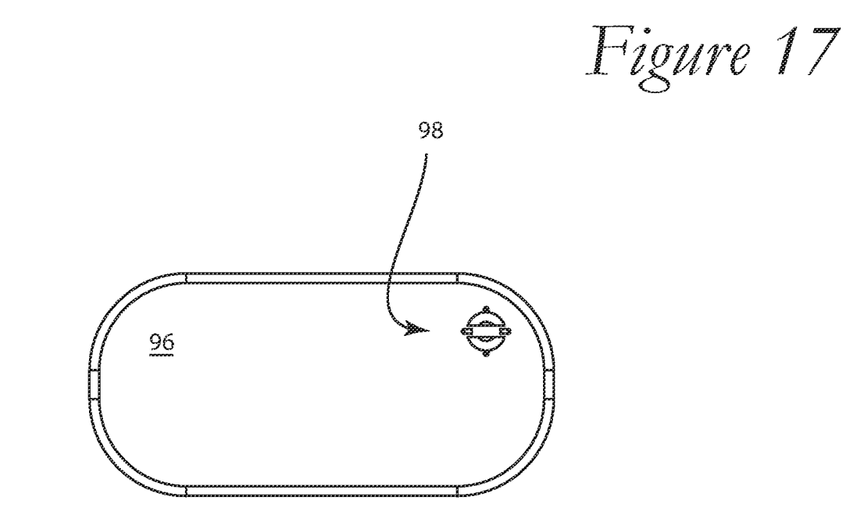
FIGS. 17-19 are respectively an upper plan view, right elevation and rear elevation of the rotatable foot member of FIG. 16.
Figure 18:
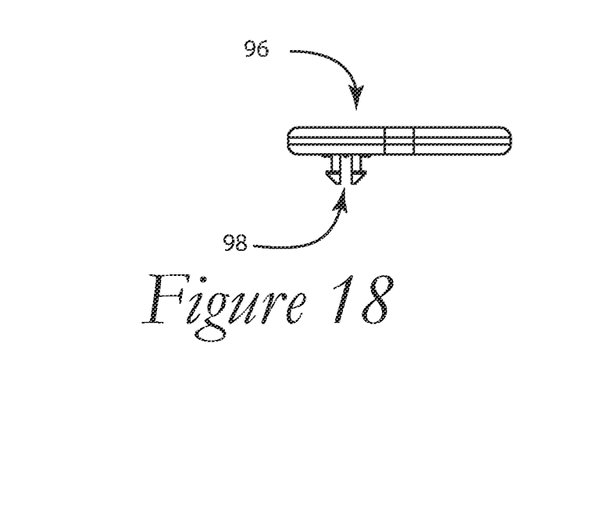
Figure 19:
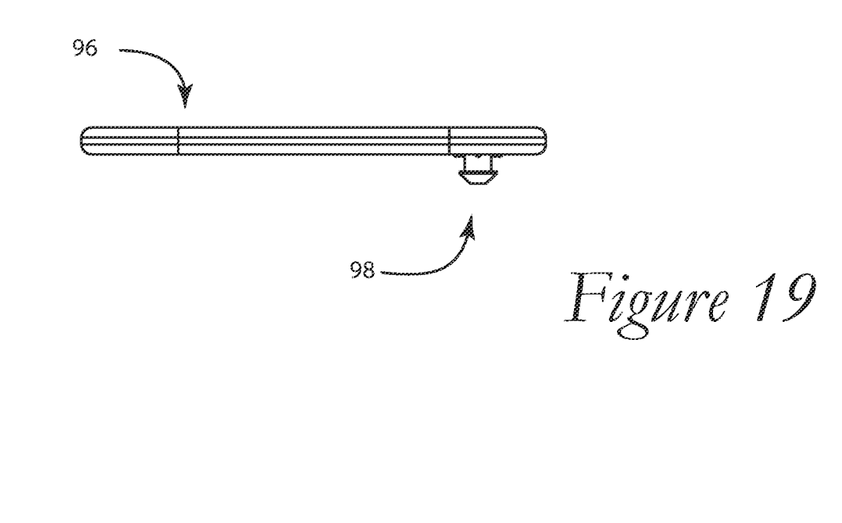

In operation, tape 82 may be unwound from reel 72 and partially withdrawn from housing shell 58 through tape aperture 62 (FIGS. 2 and 7) to be used for measuring. Upon completion of measurement, the user presses disengagement button 52 against the urging of spring 66 forcing reel 72 out of engagement with locking portion 104 of hub 78 into engagement with retraction portion 106 of hub 78 allowing tape 82 to withdraw in main housing shell 58 with complete withdrawal being prevented by engagement of tape tab 90 with tape aperture 62 which is sized to prevent complete withdrawal of tape 82 by engagement with tape tab 90. When the user wishes to allow Combination Measuring Tape/Chalk Marker Holder 50 to stand erect, rotatable foot 96 is turned to project perpendicularly from foot retention pocket 102 in main housing shell 58 (FIGS. 4 and 6). When the user wishes to stow Combination Measuring Tape/Chalk Marker Holder 50 away, rotatable foot 96 is rotated into foot retention pocket 112.

Embodiments of the Invention

There is thus provided in accordance with the invention in one aspect, embodiment 1 which is directed to a combination measuring tape/chalk marker holder comprising:
 a. a generally equilateral triangular right angular prismatic body wherein one lateral basal surface is generally planar and the other two lateral surfaces are curved outwardly, a portal being formed in one of said outwardly curved lateral surfaces; said prismatic body having two spaced apart planar sealing surfaces generally spanning the three lateral surfaces and generally sealing the interior of said prismatic body;
 b. an outwardly projecting chalk retention pocket formed adjacent said generally planar lateral basal surface, an outwardly projecting extension of said generally planar lateral basal surface defining a first wall of said retention pocket and extending along substantially the length of said generally planar lateral basal surface, leaving two lateral walls each defined by a projecting extension of one of said other lateral surfaces, each said lateral wall beginning adjacent said basal surface and extending both a minor portion of the length of its adjoining outwardly curved lateral surface and along said basal surface to penemedial position there along;
 c. a portal being formed medially in one of said planar surfaces;
 d. a flexible chalk retention member projecting from said generally planar lateral basal surface opposed to said planar surface having a portal medially formed therein, between the termini of said lateral walls near a medial location on said generally planar basal surface having normally projecting shoulder portion supporting an arm portion projecting therefrom generally in the direction of the apex of said outwardly curved lateral surfaces bearing a pressing disc generally adjacent the centroid of said prismatic body having a domed section formed thereupon projecting toward the adjacent planar sealing surface;
 e. said flexible chalk retention pocket being adapted to receive and removably retain a thin convex lensate marking body of generally the same peripheral shape as said prismatic body;
 f. a rotatable reel disposed within said generally equilateral triangular right angular prismatic body, having a flexible tape disposed thereabout, a spring operably connected to said reel and urging it to rotate counter to extension of said tape; a ratchet restraining said reel from rotation counter to extension of said tape and a clutch operable to disengage said ratchet from said reel, a clutch actuator projecting through said portal being formed medially in said one of said planar surfaces operable to disengage said clutch and allow said spring to rotate said reel to withdraw said tape into said prismatic body;
 g. a rotatable foot rotatably secured to one side of said prismatic body, said foot being rotatable between a stored disposition adjacent one side of said prismatic body and an extended disposition projecting therefrom generally normally enabling said combination measuring tape/chalk marker holder to stand erect.

Embodiment 2 is a combination measuring tape/chalk marker holder comprising:
 a. a generally triangular prismatic body having a generally planar lateral basal surface and the other two lateral surfaces, a portal being formed in one of said other lateral surfaces; said prismatic body having two spaced apart sealing surfaces generally spanning the three lateral surfaces and generally sealing the interior of said prismatic body;
 b. an outwardly projecting chalk retention pocket formed adjacent said generally planar lateral basal surface;
 c. a flexible chalk retention member projecting from said prismatic body, said flexible chalk retention member supporting an arm portion projecting therefrom generally toward the center of said prismatic body bearing a pressing region generally adjacent the centroid of said prismatic body having a section formed thereupon projecting toward the adjacent sealing surface;
 d. said pocket being adapted to removably retain a thin convex lensate marking body of generally the same peripheral shape as said generally prismatic body;
 e. a rotatable reel disposed within said generally triangular right angular prismatic body, having a flexible tape disposed thereabout, a spring operably connected to said reel and urging it to rotate counter to extension of said tape; a ratchet restraining said reel from rotation counter to extension of said tape and a clutch operable to disengage said ratchet from said reel, a clutch actuator projecting through said portal being formed medially in said one of said planar surfaces operable to disengage said clutch and allow said spring to rotate said reel to withdraw said tape into said prismatic body.

Embodiment 3 is the combination measuring tape/chalk holder of embodiment 2, further comprising a rotatable foot rotatably secured to one side of said prismatic body, said foot being rotatable between a stored disposition adjacent one side of said prismatic body and an extended disposition projecting therefrom generally normally enabling said combination measuring tape/chalk marker holder to stand erect.

It should be understood, of course, that the foregoing relates to exemplary embodiments of the invention and that modifications may be made without departing from the spirit and scope of the invention as set forth in the following claims.

What is claimed is:

1. A combination measuring tape/chalk marker holder comprising:
   a. a generally equilateral triangular prismatic body wherein a lateral basal surface is substantially planar and two other lateral surfaces are curved outwardly, a portal being formed in one of said two other lateral surfaces; said prismatic body having two spaced apart planar sealing surfaces generally spanning the two other lateral surfaces and generally sealing an interior of said prismatic body;
   b. an outwardly projecting chalk retention pocket formed adjacent said lateral basal surface, an outwardly projecting extension of said lateral basal surface defining a first wall of said chalk retention pocket and extending along substantially a length of said lateral basal surface, leaving two lateral walls each defined by a projecting extension of one of said two other lateral surfaces, each said lateral wall beginning adjacent said lateral basal surface and extending both a minor portion of a length of its adjoining outwardly curved lateral surface and along said lateral basal surface to penemedial position there along;
   c. a portal being formed medially in one of said planar sealing surfaces;
   d. a flexible chalk retention member projecting from said lateral basal surface opposed to said planar sealing surface having a portal medially formed therein, between termini of said lateral walls near a medial location on said lateral basal surface having normally projecting shoulder portion supporting an arm portion projecting therefrom generally in the direction of an apex of said outwardly curved two other lateral surfaces bearing a pressing disc generally adjacent a centroid of said prismatic body having a domed section formed thereupon projecting toward the planar sealing surface adjacent thereto;
   e. said chalk retention pocket being flexible and being adapted to receive and removably retain a thin convex lensate marking body of generally the same peripheral shape as said prismatic body;
   f. a rotatable reel disposed within said generally equilateral triangular prismatic body, having a flexible tape disposed thereabout, a spring operably connected to said rotatable reel and urging it to rotate counter to extension of said flexible tape; a ratchet restraining said rotatable reel from rotation counter to extension of said flexible tape and a clutch operable to disengage said ratchet from said rotatable reel, a clutch actuator projecting through said portal being formed medially in said one of said planar sealing surfaces operable to disengage said clutch and allow said spring to rotate said rotatable reel to withdraw said flexible tape into said prismatic body; and
   g. a rotatable foot rotatably secured to one side of said prismatic body, said rotatable foot being rotatable between a stored disposition adjacent one side of said prismatic body and an extended disposition projecting therefrom generally normally enabling said combination measuring tape/chalk marker holder to stand erect.

2. A combination measuring tape/chalk marker holder comprising:
   a. a generally triangular prismatic body having a substantially planar lateral basal surface and two other lateral surfaces, a portal being formed in one of said two other lateral surfaces; said prismatic body having two spaced apart sealing surfaces generally spanning the substantially planar lateral basal surface and the two other lateral surfaces and generally sealing an interior of said prismatic body;
   b. an outwardly projecting chalk retention pocket formed adjacent said substantially planar lateral basal surface;
   c. a flexible chalk retention member projecting from said prismatic body, said flexible chalk retention member supporting an arm portion projecting therefrom generally toward a center of said prismatic body bearing a pressing region generally adjacent a centroid of said prismatic body having a section formed thereupon projecting toward the sealing surface adjacent thereto;
   d. said chalk retention pocket being adapted to removably retain a thin convex lensate marking body of generally the same peripheral shape as said generally triangular prismatic body; and
   e. a rotatable reel disposed within said generally triangular prismatic body, having a flexible tape disposed thereabout, a spring operably connected to said rotatable reel and urging it to rotate counter to extension of said flexible tape; a ratchet restraining said rotatable reel from rotation counter to extension of said flexible tape and a clutch operable to disengage said ratchet from said rotatable reel, a clutch actuator projecting through said portal being formed medially in said one of said sealing surfaces operable to disengage said clutch and allow said spring to rotate said rotatable reel to withdraw said flexible tape into said prismatic body.

3. The combination measuring tape/chalk marker holder of claim 2, further comprising a rotatable foot rotatably secured to one side of said prismatic body, said rotatable foot being rotatable between a stored disposition adjacent one side of said prismatic body and an extended disposition projecting normally therefrom enabling said combination measuring tape/chalk marker holder to stand erect.

4. A combination measuring tape/chalk marker holder, comprising:
   a. a main housing comprising a main housing shell and a back plate, said main housing having a main housing base and two outwardly curved lateral walls meeting at an apex to form a substantially equilateral triangular prismatic body;
   b. a flexible measuring tape disposed about a locking reel within the main housing, said locking reel being releasably engaged with a locking hub formed on the back plate; and
   c. a chalk retention pocket fixed to the back plate and extending therefrom, having a chalk retention pocket base, two substantially parallel lateral walls, and a flexible chalk retention member, said chalk retention pocket base being parallel to and coextensive with the main housing base; wherein the flexible chalk retention member comprises an arm portion extending to form a pressing disc; the arm portion projects perpendicularly from the chalk retention pocket base, parallel to the back plate, and toward a center thereof; and the pressing disc is adjacent to a centroid of the main housing, with a portion of the pressing disc projecting toward the back plate.

5. The combination measuring tape/chalk marker holder of claim 4, further comprising:
   a. a disengagement button protruding from a release aperture within a front surface of the main housing shell, said disengagement button being operative to urge the locking hub and the locking reel out of locking engagement; and
   b. a spring retained at one end within a central cavity of the disengagement button, extending through a central opening in the locking reel, and retained at an other end within a retaining aperture of the back plate, said spring being operative to hold the locking hub in locking engagement with the locking reel and to impel retraction of the flexible measuring tape when the locking hub and the locking reel are urged out of locking engagement.

6. The combination measuring tape/chalk marker holder of claim 4, wherein the flexible measuring tape further comprises a tab on a free end thereof, said flexible measuring tape extends through a portal formed in one of the two outwardly curved lateral walls, and said tab is configured to prevent the free end of the flexible measuring tape from retracting into the main housing.

7. The combination measuring tape/chalk marker holder of claim 4, further comprising a rotatable foot member having a capped pin rotatably secured within a foot retention aperture in the main housing base, wherein the rotatable foot member is rotatable between a stored disposition within the main housing base and an extended position projecting perpendicularly from a longitudinal axis of the main housing base.

8. The combination measuring tape/chalk marker holder of claim 4, wherein the main housing shell comprises a front surface parallel and spaced apart from the back plate, such that said front surface and said back plate seal an interior of the main housing.

* * * * *